(12) United States Patent
Zhang

(10) Patent No.: US 11,648,862 B2
(45) Date of Patent: May 16, 2023

(54) CHILD SAFETY SEAT

(71) Applicant: Bambino Prezioso Switzerland AG, Steinhausen (CH)

(72) Inventor: Da Liang Zhang, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/892,149

(22) Filed: Aug. 22, 2022

(65) Prior Publication Data

US 2022/0388434 A1    Dec. 8, 2022

Related U.S. Application Data

(63) Continuation of application No. 17/023,377, filed on Sep. 17, 2020, now Pat. No. 11,485,263.

(30) Foreign Application Priority Data

Sep. 19, 2019 (CN) .......................... 201910891408.5

(51) Int. Cl.
*B60N 2/90* (2018.01)
*B60N 2/00* (2006.01)
*B60N 2/28* (2006.01)
*B60R 21/015* (2006.01)

(52) U.S. Cl.
CPC ............... *B60N 2/90* (2018.02); *B60N 2/002* (2013.01); *B60N 2/2821* (2013.01); *B60N 2/2869* (2013.01); *B60N 2/2875* (2013.01); *B60N 2002/981* (2018.02); *B60R 21/01554* (2014.10); *B60R 21/01556* (2014.10)

(58) Field of Classification Search
CPC .... B60N 2/2869; B60N 2/2821; B60N 2/002; B60R 21/01556; B60R 21/01554
See application file for complete search history.

(56) References Cited

U.S. PATENT DOCUMENTS

| | | | |
|---|---|---|---|
| 4,936,629 | A | 6/1990 | Young |
| 5,515,933 | A | 5/1996 | Meyer |
| 5,790,031 | A | 8/1998 | Shelton |

(Continued)

FOREIGN PATENT DOCUMENTS

| | | |
|---|---|---|
| CN | 201856670 U | 6/2011 |
| CN | 207790409 U | 8/2018 |

(Continued)

*Primary Examiner* — Syed A Islam
(74) *Attorney, Agent, or Firm* — Winston Hsu

(57) ABSTRACT

A child safety seat is provided and includes a base, a seat body and a notifying system. The seat body is movable relative to the base between a first position and a second position. The notifying system includes at least one actuated device disposed on one of the base and the seat body, an actuating component disposed on another one of the base and the seat body, and a notifying device electrically connected to the at least one actuated device. When the seat body reaches at least one of the first position and the second position, the actuating component actuates the at least one actuated device, so that the at least one actuated device is actuated to generate different types of actuating signals. The notifying device generates different types of notifying signals when the at least one actuated device generates the different types of actuating signals.

20 Claims, 8 Drawing Sheets

(56) References Cited

U.S. PATENT DOCUMENTS

| | | |
|---|---|---|
| 6,196,629 B1 | 3/2001 | Onishi |
| 6,357,790 B1 | 3/2002 | Swann |
| 7,100,981 B2 | 9/2006 | Mack |
| 7,481,492 B2 | 1/2009 | Lhomme |
| 8,702,169 B2 | 4/2014 | Abadilla |
| 9,443,411 B2 | 9/2016 | Schoenberg |
| 9,487,111 B2 | 11/2016 | Lake |
| 10,163,316 B2 | 12/2018 | Roisen |
| 10,259,345 B2 | 4/2019 | Schonfeld |
| 10,449,876 B2 | 10/2019 | Lonstein |
| 10,457,168 B2 | 10/2019 | Anderson |
| 11,054,819 B2 | 7/2021 | Sandbothe |
| 2008/0164990 A1* | 7/2008 | Anderson ............. B60Q 9/00 340/457 |
| 2010/0253498 A1 | 10/2010 | Rork |
| 2013/0201013 A1 | 8/2013 | Schoenberg |
| 2015/0091348 A1 | 4/2015 | Juchniewicz |
| 2016/0207497 A1 | 7/2016 | Seal |
| 2017/0355287 A1 | 12/2017 | Anderson |
| 2021/0188136 A1 | 6/2021 | Goldman |

FOREIGN PATENT DOCUMENTS

| | | |
|---|---|---|
| CN | 208559099 U | 3/2019 |
| CN | 109624803 A | 4/2019 |
| EP | 1 974 988 A2 | 10/2008 |
| JP | 2018-122618 A | 8/2018 |
| WO | 00/01561 A1 | 1/2000 |

\* cited by examiner

CHILD SAFETY SEAT

CROSS REFERENCE TO RELATED APPLICATIONS

This application is a continuation application of U.S. application Ser. No. 17/023,377, filed on Sep. 17, 2020. The content of the application is incorporated herein by reference.

BACKGROUND OF THE INVENTION

1. Field of the Invention

The present invention relates to a child product, and more specifically, to a child safety seat with an easy operation, rapid notification, and improved fool proof design.

2. Description of the Prior Art

With increase in vehicle population, it becomes an important topic to ensure safety of a child riding in a vehicle. A child safety seat is a child product which is specifically designed for a child riding in a vehicle to ensure the child's safety.

An installation method of a child safety seat is usually determined according to a weight, a height or an age of a child, i.e., in order to provide a better protection for children of different ages, having different weights and heights, a child safety seat can be installed in different manners. For example, some associations and regulations recommend that a child safety seat can be installed at a rear facing position, i.e., the child safety seat faces toward a rear side of a vehicle, when a child is less than 2 years old, or less than 76 centimeters, or less than 18 kilograms, and a child safety seat can be installed at a front facing position, i.e., the child safety seat faces toward a front side of a vehicle, when a child is more than 2 years old, or more than 76 centimeters, or more than 18 kilograms.

In order to ensure a child safety seat to be installed at a proper position, there is a child safety seat equipped with an indication device. The indication device measures a weight of a child sitting in the child safety seat and provides an indication of installation of the child safety seat at a front facing position or a rear facing position after logical judgment. However, the aforementioned operation of the indication device is complicated and takes times. Furthermore, if the indication device indicates that the child safety seat is located at an improper position, a caregiver has to remove his/her child from the child safety seat before adjusting the child safety seat, or adjust the child safety seat with the child, which not only requires more efforts and brings difficulty in adjustment but also tends to make the child cry.

SUMMARY OF THE INVENTION

Therefore, it is an objective of the present invention to provide a child safety seat with an easy operation, rapid notification, and improved fool proof design.

In order to achieve the aforementioned objective, the present invention discloses a child safety seat. The child safety seat includes a base, a seat body and a notifying system. The seat body is movable relative to the base between a first position and a second position. The notifying system includes at least one actuated device, an actuating component and a notifying device. The at least one actuated device is disposed on one of the base and the seat body. The actuating component is disposed on another one of the base and the seat body and configured to actuate the at least one actuated device when the seat body reaches at least one of the first position and the second position. The at least one actuated device is actuated to generate different types of actuating signals when the seat body is located at the first position and the second position. The notifying device is electrically connected to the at least one actuated device and configured to generate different types of notifying signals when the at least one actuated device is actuated by the actuating component to generate the different types of actuating signals.

According to an embodiment of the present invention, a pivoting disc is disposed on one of the base and the seat body.

According to an embodiment of the present invention, a pivoting recess is formed on another one of the base and the seat body, and the pivoting disc is pivotally disposed inside the pivoting recess.

According to an embodiment of the present invention, the actuating component is disposed on at least one of two different sides of one of the pivoting disc and the base, and the at least one actuated device is disposed on at least one of two different sides of another one of the pivoting disc and the base.

According to an embodiment of the present invention, the actuating component is disposed on at least one of two opposite sides of one of the pivoting disc and the base, and the at least one actuated device is disposed on at least one of two opposite sides of another one of the pivoting disc and the base.

According to an embodiment of the present invention, the actuating component is disposed on at least one of a front side and a rear side of one of the pivoting disc and the base, and the at least one actuated device is disposed on at least one of a front side and a rear side of another one of the pivoting disc and the base.

According to an embodiment of the present invention, the actuating component actuates the at least one actuated device when the seat body is detachably installed on the base and reaches at least one of the first position and the second position.

According to an embodiment of the present invention, the at least one actuated device is disposed on at least one of two different sides of one of the base and the seat body, and the actuating component is disposed on at least one of two different sides of another one of the base and the seat body.

According to an embodiment of the present invention, the at least one actuated device is disposed on at least one of two opposite sides of one of the base and the seat body, and the actuating component is disposed on at least one of two opposite sides of another one of the base and the seat body.

According to an embodiment of the present invention, the at least one actuated device is disposed on at least one of a front side and a rear side of one of the base and the seat body, and the actuating component is disposed on at least one of a front side and a rear side of another one of the base and the seat body.

According to an embodiment of the present invention, the notifying device includes a signal processing component electrically connected to the at least one actuated device, and a notifying component electrically connected to the signal processing component. The signal processing component is configured to process a corresponding one of the different types of actuating signals generated from the at least one actuated device when the at least one actuated device is actuated by the actuating component, and the notifying component is configured to receive the corresponding one of the different types of actuating signals processed by the signal processing component to generate a corresponding one of the different types of notifying signals.

According to an embodiment of the present invention, any two of the at least one actuated device, the signal processing component and the notifying component are connected in a wired connection or a wireless connection.

According to an embodiment of the present invention, the signal processing component is disposed on one of the base and the seat body, and the notifying component is disposed on another one of the base and the seat body.

According to an embodiment of the present invention, the signal processing component and the notifying component are disposed on one of the base and the seat body.

According to an embodiment of the present invention, the notifying component is an audio notifying component or a video notifying component.

According to an embodiment of the present invention, the at least one actuated device and the notifying device are electrically connected in a series connection, and when the seat body reaches at least one of the first position and the second position, the at least one actuated device and the notifying device are in a closed circuit, so that the notifying device is powered on to generate a corresponding one of the different types of notifying signals.

According to an embodiment of the present invention, the at least one actuated device is a non-contact sensor or a mechanical switch.

According to an embodiment of the present invention, a corresponding one of the different types of notifying signals indicates at least one of a height, a weight and an age of a child corresponding to the seat body reaching the first position or the second position.

According to an embodiment of the present invention, the seat body is pivoted to the base around a pivoting axis, and the seat body is pivotally movable between the first position and the second position around the pivoting axis.

According to an embodiment of the present invention, the first position and the second position are respectively a front facing position and a rear facing position.

In summary, in the present invention, the child safety seat includes the notifying system which includes the actuated device installed on one of the base and the seat body, the actuating component installed on another one of the base and the seat body and configured to actuate the actuated device when the seat body reaches at least one of the front facing position and the rear facing position, and the notifying device electrically connected to the actuated device and configured to generate the notifying signal when the actuated device is actuated by the actuating component. Furthermore, the notifying signal indicates at least one of the height, the weight and the age of the child corresponding to the seat body reaching the front facing position or the rear facing position. A caregiver can determine whether the child safety seat is suitable for his/her child according to the notifying signal easily without placing his/her child in the child safety seat. Therefore, the present invention is with an easy operation, rapid notification, and improved fool proof design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
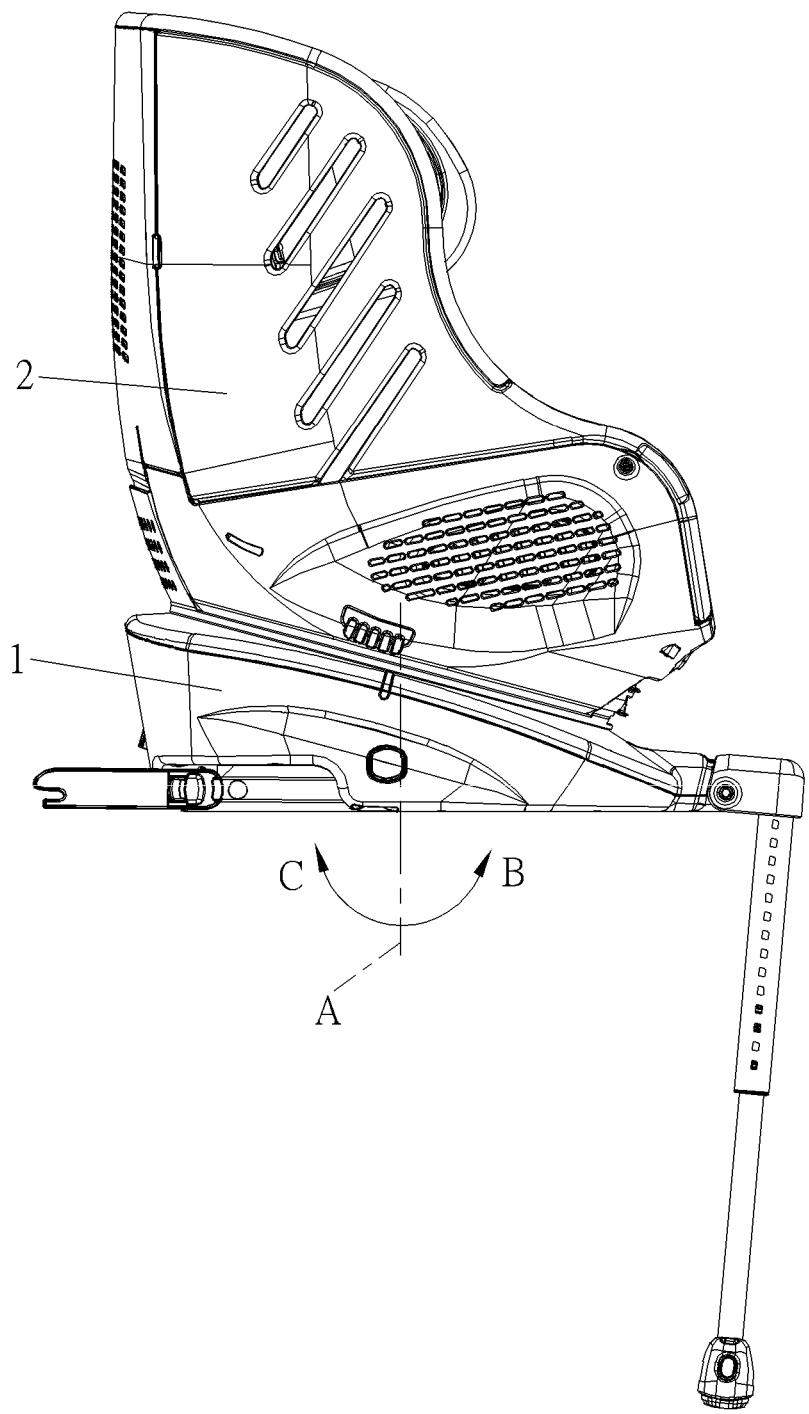
FIG. 1 is a lateral diagram of a child safety seat in a front facing state according to a first embodiment of the present invention.

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct electrical/mechanical connection. Thus, if a first device is connected to a second device, that connection may be through a direct electrical/mechanical connection, or through an indirect electrical/mechanical connection via other devices and connections.

The child safety seat of the present invention includes a base, a seat body disposed on the base and movable relative to the base between a front facing position and a rear facing position, and a notifying system. The notifying system includes an actuated device installed on one of the base and the seat body, an actuating component installed on another one of the base and the seat body and configured to actuate the actuated device when the seat body reaches at least one of the front facing position and the rear facing position, and a notifying device electrically connected to the actuated device and configured to generate the notifying signal when the actuated device is actuated by the actuating component.

Specifically, the seat body can be pivotally disposed on the base around a pivoting axis, so that the actuating component can actuate the actuated device when the seat body is pivoted relative to the base to reach at least one of the front facing position and the rear facing position, which achieves a convenient switching movement of the seat body relative to the base between the front facing position and the rear facing position. However, the present invention is not limited to this embodiment. For example, in another embodiment, the actuating component can be configured to actuate the actuated device when the seat body is detachably installed on the base at the front facing position and/or the rear facing position, i.e., the seat body can be switched between the front facing position and the rear facing position by disassembling and assembling.

Furthermore, specifically, the actuated device can be a non-contact sensor or a mechanical switch. When the actuated device is a non-contact sensor, e.g., a light sensor, the actuating component can be a mechanical structure, e.g., an actuating block or an actuating hole for blocking or reflecting light emitted from the light sensor to actuate the non-contact sensor. When the actuated device is a mechanical switch, the actuating component can be an actuating block for switching on or switching off the mechanical switch.

Detailed description for the following preferred embodiments is provided as follows. However, the present invention is not limited to the following preferred embodiments. Any child safety seat including the base, the seat body and the notifying system is included within the scope of the present invention.

Figure 2:
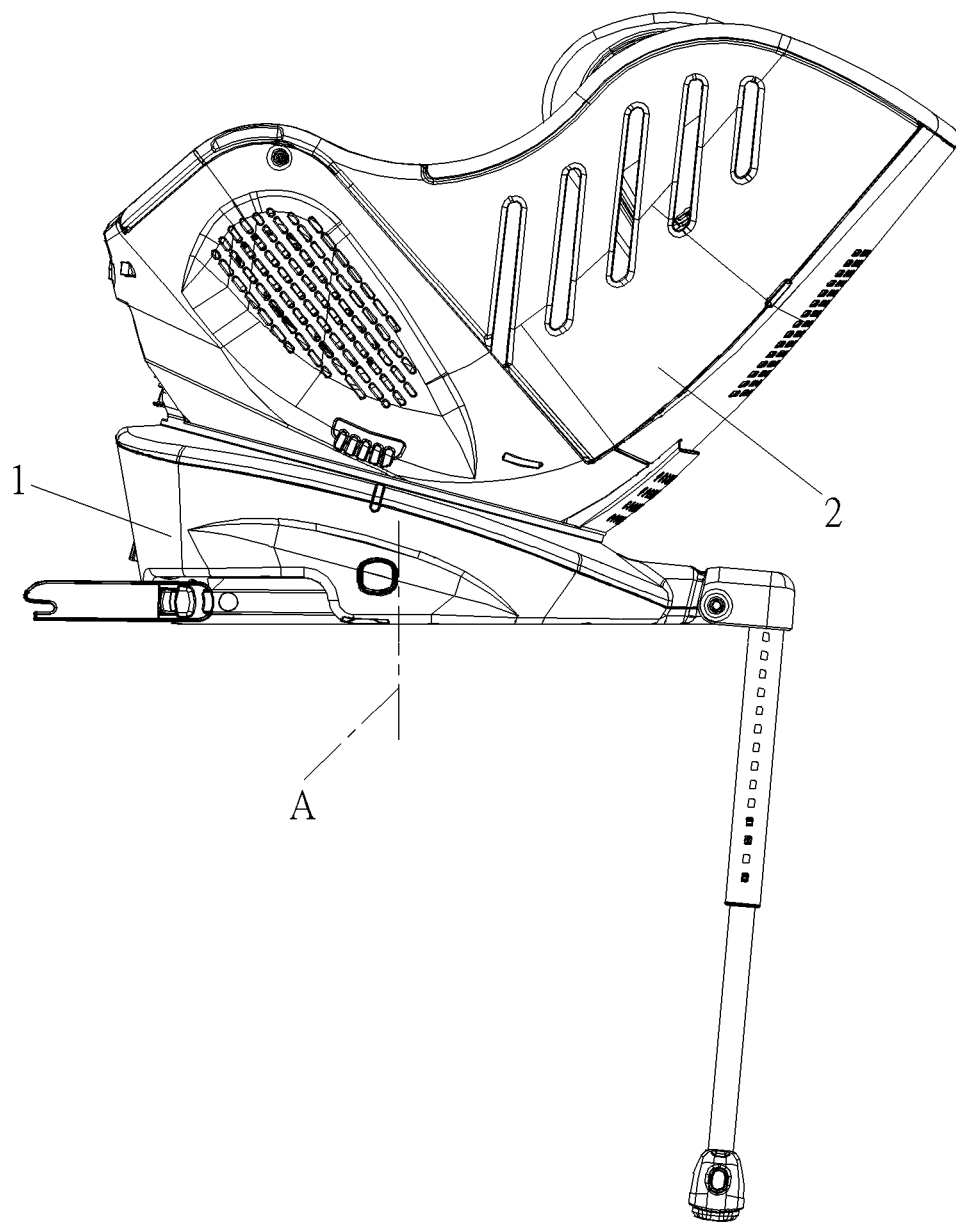
FIG. 2 is a lateral diagram of the child safety seat in a rear facing state according to the first embodiment of the present invention.
Figure 3:
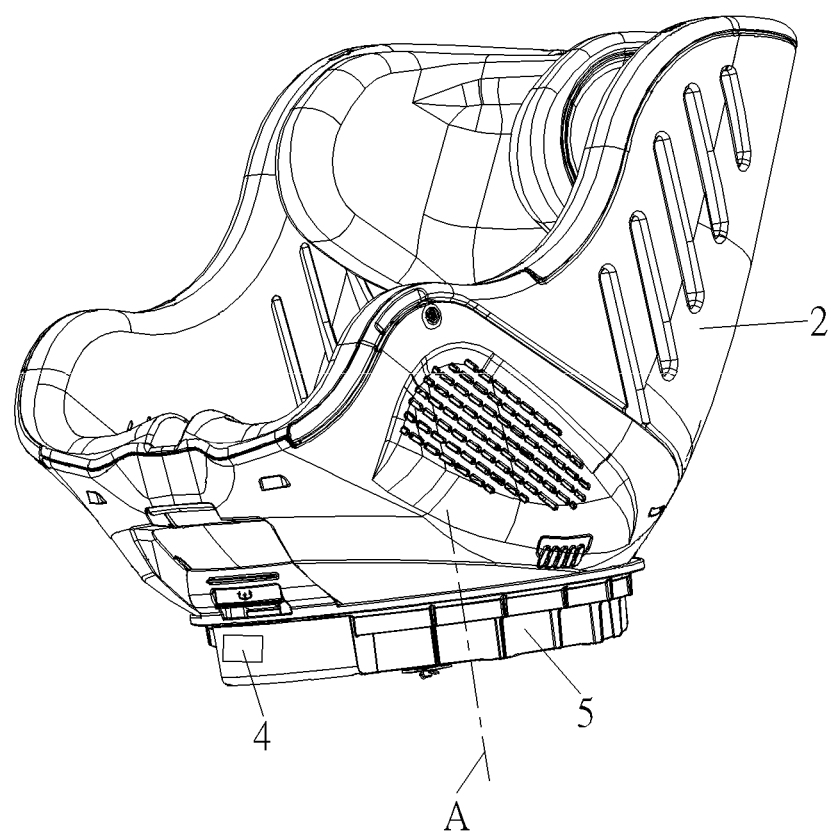
FIG. 3 is a diagram of partial structure the child safety seat according to the first embodiment of the present invention.
Figure 4:
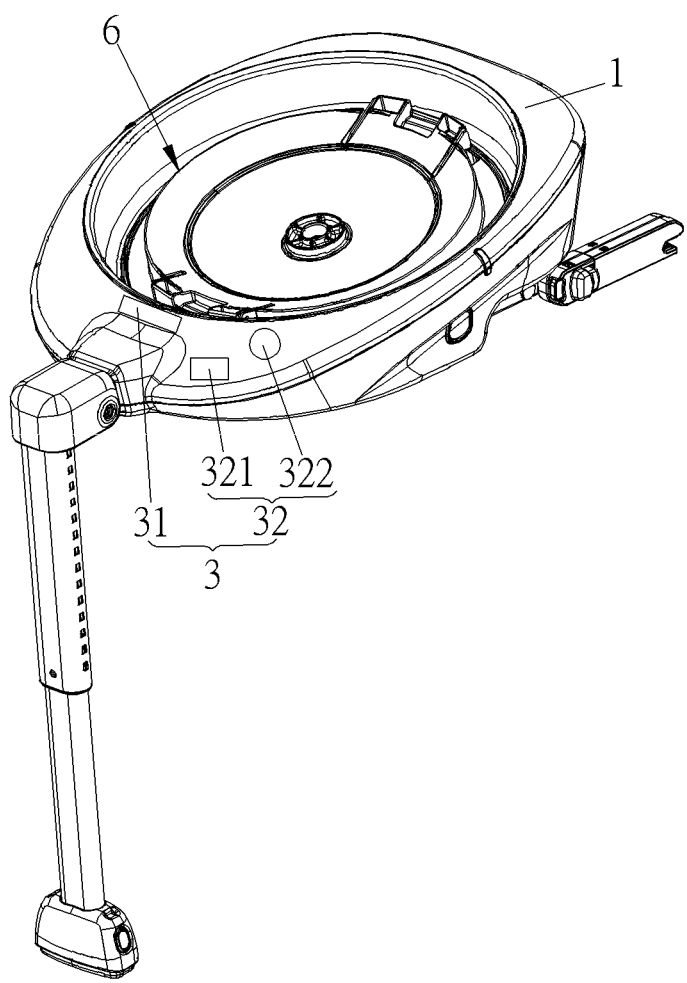
FIG. 4 is another diagram of partial structure the child safety seat according to the first embodiment of the present invention.

Please refer to FIG. 1 to FIG. 4. FIG. 1 is a lateral diagram of a child safety seat 100 in a front facing state according to a first embodiment of the present invention. FIG. 2 is a lateral diagram of the child safety seat 100 in a rear facing state according to the first embodiment of the present invention. FIG. 3 is a diagram of partial structure the child safety seat 100 according to the first embodiment of the present invention. FIG. 4 is another diagram of partial structure of the child safety seat 100 according to the first embodiment of the present invention. As shown in FIG. 1 to FIG. 4, the child safety seat 100 includes a base 1, a seat body 2 and a notifying system 3. The seat body 2 is disposed on the base 1 and movable relative to the base 1 between a front facing position as shown in FIG. 1 and a rear facing position as shown in FIG. 2. The notifying system 3 includes an actuated device 31, an actuating component 4 and a notifying device 32. The actuated device 31 is disposed on the base 1. The actuating component 4 is disposed on the seat body 2 and configured to actuate the actuated device 31 when the seat body 2 reaches the front facing position. The notifying device 32 is electrically connected to the actuated device 31 and configured to generate a notifying signal when the actuated device 31 is actuated by the actuating component 4. The notifying signal can be a loop signal which indicates at least one of a height, a weight and an age of a child corresponding to the seat body 2 reaching the front facing position, so that a caregiver can determine whether the child safety seat 100 is suitable for his/her child according to the notifying signal easily without placing his/her child in the child safety seat 100. For example, the notifying signal can indicate a child corresponding to the seat body 2 reaching the front facing position should be more than 76 centimeters, or more than 18 kilograms, or more than 2 years old.

However, the present invention is not limited to this embodiment. For example, in another embodiment, the actuated device and the actuating component can be respectively installed on the seat body and the base, and such configuration also can allow the notifying device to generate the notifying signal when the seat body reaches the front facing position. Furthermore, in another embodiment, the notifying device can be configured to generate the notifying signal when the seat body reaches the rear facing position, and the notifying signal can indicate a child corresponding to the seat body reaching the rear facing position should be less than 76 centimeters, or less than 18 kilograms, or less than 2 years old.

Specifically, as shown in FIG. 3 and FIG. 4, the actuated device 31 is a non-contact sensor. Preferably, in this embodiment, the actuated device 31 can be an infrared light sensor. When the actuated device 31 is the non-contact sensor, there is no need with physical contact between the actuated device 31 and the actuating device 4. Therefore, collision damage of the actuated device 31 can be effectively prevented. However, the present invention is not limited to this embodiment. For example, in another embodiment, in order to allow the actuated device to be actuated by the actuating component more responsively, the actuated device can be a mechanical switch, and the actuated device and the notifying device can be electrically connected in a series connection. When the seat body reaches at least one of the front facing position and the rear facing position, the actuated device actuated by the actuating component and the notifying device can be in a closed circuit, so that the notifying device is powered on to generate the notifying signal by an external power source, wherein the external power source can be a battery installed in the seat body or the base, or an automotive battery of a vehicle.

Furthermore, as shown in FIG. 3 and FIG. 4, the notifying device 32 includes a signal processing component 321 electrically connected to the actuated device 31, and a notifying component 322 electrically connected to the signal processing component 321. The signal processing component 321 is configured to process an actuating signal generated from the actuated device 31 when the actuated device 31 is actuated by the actuating component 4, and the notifying component 322 is configured to receive the actuating signal processed by the signal processing component 321 to generate the notifying signal. More specifically, in this embodiment, any two of the actuated device 31, the signal processing component 321 and the notifying component 322 can be connected in a wired connection for ensuring stable and fast signal transmission in the notifying system. However, the present invention is not limited to this embodiment. For example, in another embodiment, any two of the actuated device, the signal processing component and the notifying component can be connected in a wireless connection for making structure of the notifying system compact and easy to arrange.

Preferably, in this embodiment, the notifying component 322 can be an audio notifying component, such as an audio speaker, or a video notifying component, such as a liquid-crystal display device. However, the present invention is not limited to this embodiment.

Preferably, in this embodiment, in order to make the structure the notifying system 3 compact, as shown in FIG. 4, the signal processing device 321 and the notifying component 322 can be installed on the base 1. However, the configuration of the signal processing device and the notifying component is not limited to this embodiment. It depends on practical demands. For example, in another embodiment, the signal processing device and the notifying component can be installed on the seat body. Alternatively, in another embodiment, the signal processing device and the notifying component can be respectively installed on the base and the seat body. Alternatively, in another embodiment, the signal processing device and the notifying component can be respectively installed on the seat body and the base.

As shown in FIG. 1 to FIG. 4, the seat body 2 is pivoted to the base 1 around a pivoting axis A, so that the actuated device 31 can be actuated by the actuating component 4 when the seat body 2 is pivoted relative to the base 1 around the pivoting axis A to reach the front facing position as shown in FIG. 1, which makes the switching movement of the seat body 2 relative to the base 1 between the front facing position and the rear facing position more convenient and effort saving.

Specifically in this embodiment, a pivoting disc 5 is disposed on the seat body 2, and a pivoting recess 6 is formed on the base 1. The pivoting disc 5 is located at a bottom portion of the seat body 2, and the pivoting axis A passes through a center of the pivoting disc 5 for preventing an unbalanced force caused by rotation of the pivoting disc 5. The pivoting recess 6 is located at a top portion of the base 1, and the pivoting disc 5 is pivotally disposed inside the pivoting recess 6. The configuration of the pivoting disc 5 and the pivoting recess 6 makes structure of the child safety seat 100 more compact and aesthetic and makes a pivoting movement of the seat body 2 relative to the base 1 more reliable. However, the present invention is not limited to this embodiment. For example, in another embodiment, the pivoting disc can be disposed on the base, and the pivoting recess can be formed on the seat body.

Furthermore, as shown in FIG. 3 and FIG. 4, in order to achieve the actuating component 4 to actuate the actuated device 31 responsively when the seat body 2 is pivoted to the front facing position, the actuating component 4 can be disposed on a front side of the pivoting disc 5, and the actuated device 31 can be disposed on a front side of the base 1. However, the present invention is not limited to this embodiment. For example, in another embodiment, the actuating component can be disposed on the front side of the base, and the actuated device can be disposed on the front side of the pivoting disc. Alternatively, in another embodiment, the actuating component can be configured to actuate the actuated device when the seat body is installed on the base at the front facing position and/or the rear facing position, i.e., the seat body can be switched between the front facing position and the rear facing position by disassembling and assembling.

Detailed description of operational principle of the child safety seat 100 is provided as follows. When the seat body 2 is located at the front facing position as shown in FIG. 1, the actuating component 4 located at the front side of the pivoting disc 5 can actuate the actuated device 31 located at the front side of the base 1, so that the actuated device 31 can generate the actuating signal and then transmit the actuating signal to the signal processing device 321. After the signal processing device 321 receives the actuating signal, the signal processing device 321 can process the actuating signal and then transmit the processed actuating signal to the notifying component 322. After the notifying component 322 receives the processed actuating signal, the notifying component 322 can generate the notifying signal to indicate at least one of a height, a weight and an age of a child corresponding to the seat body 2 reaching the front facing position, so that the caregiver can determine whether the child safety seat 100 is suitable for his/her child according to the notifying signal easily without placing his/her child in the child safety seat 100. When the caregiver would like to switch the child safety seat 100 from the front facing state as shown in FIG. 1 to the rear facing state as shown in FIG. 2, the caregiver can pivot the seat body 2 around the pivoting axis A in a first pivoting direction B or a second pivoting direction C relative to the base 1. When the seat body 2 is pivoted to the rear facing position as shown in FIG. 2, the actuating component 4 is pivoted to a position adjacent to a rear side of the base 1 and away from the actuated device 31. At this moment, the actuated device 31 cannot be actuated, and therefore, the notifying device 32 cannot generate the notifying signal.

Figure 5:
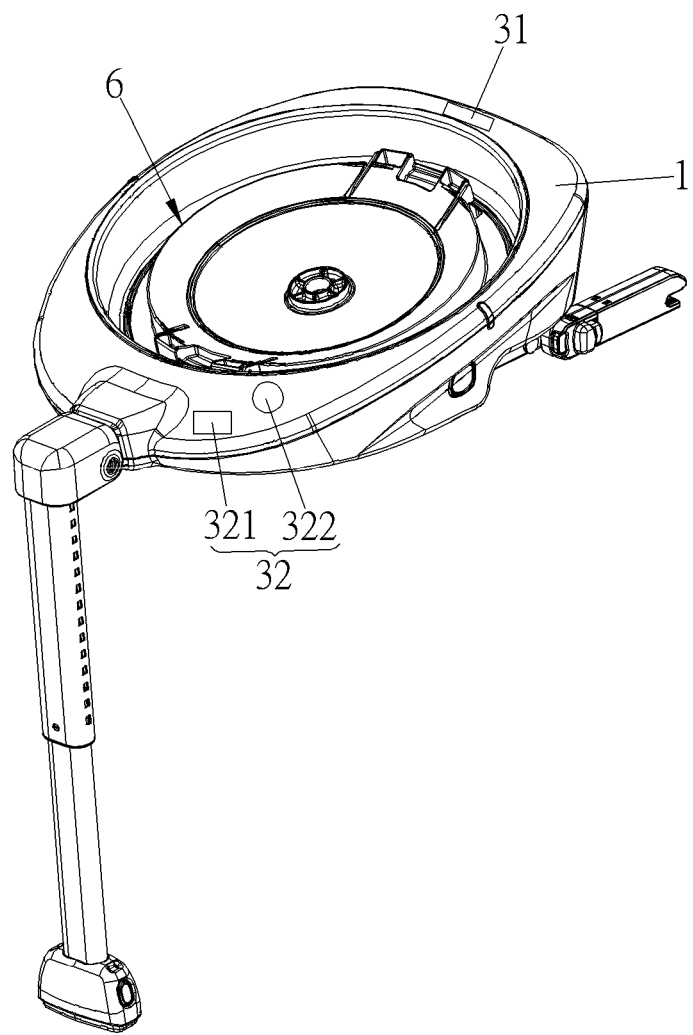
FIG. 5 is a diagram of partial structure of a child safety seat according to a second embodiment of the present invention.

Please refer to FIG. 5. FIG. 5 is a diagram of partial structure of a child safety seat according to a second embodiment of the present invention. As shown in FIG. 5, different from the first embodiment, in this embodiment, the actuated device 31 is disposed on the rear side of the base 1, and therefore, the actuating component can actuate the actuated device 31 to allow the notifying device 32 to generate the notifying signal when the seat body is pivotally switched to the rear facing position relative to the base 1 around the pivoting axis. When the seat body is pivotally switched to the front facing position relative to the base 1 around the pivoting axis, the actuating component is moved to a position adjacent to the front side of the base 1 and away from the actuated device 31, so that the notifying device 32 cannot generate the notifying signal.

Figure 6:
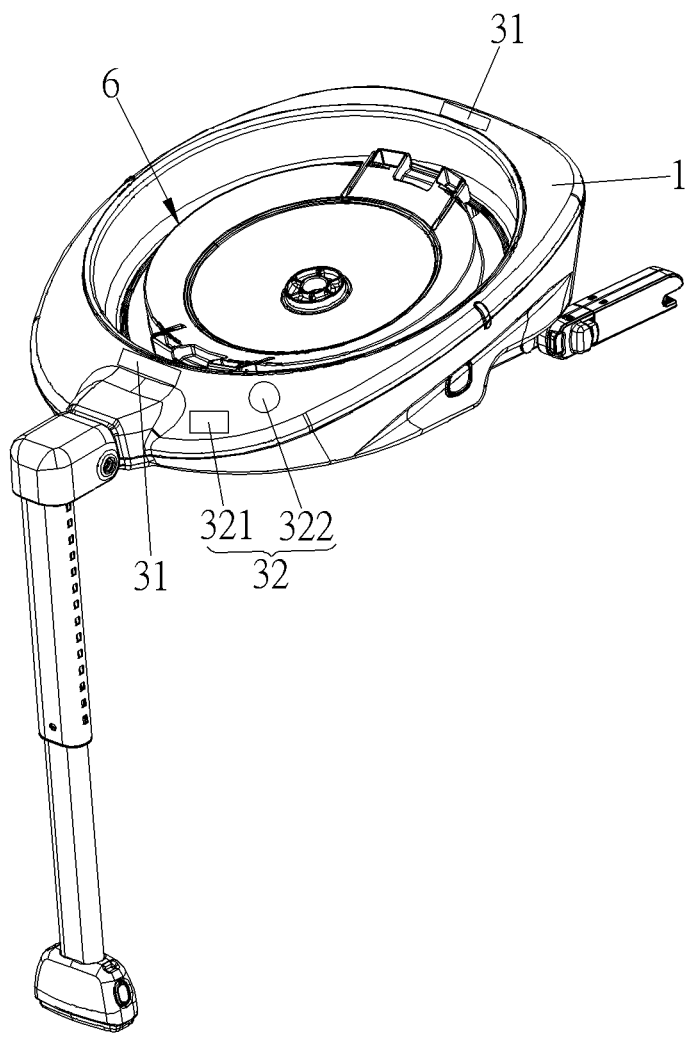
FIG. 6 is a diagram of partial structure of a child safety seat according to a third embodiment of the present invention.

Please refer to FIG. 6. FIG. 6 is a diagram of partial structure of a child safety seat according to a third embodiment of the present invention. As shown in FIG. 6, different from the aforementioned embodiments, in this embodiment, the child safety seat includes one actuating component disposed on the front side of the pivoting disc on the seat body, and two actuated devices 31 respectively disposed on the front side and the rear side of the base 1, and therefore, the actuating component on the pivoting disc can actuate the front actuated device 31 or the rear actuated device 31 to allow the notifying device 32 to generate the corresponding notifying signal when the seat body is pivotally switched to the front facing position or the rear facing position relative to the base 1 around the pivoting axis. Furthermore, preferably, in this embodiment, the front actuated device 31 and the rear actuated device 31 can be configured to generate different actuating signals to allow the notifying device 32 to generate different notifying signals to indicate corresponding information for the caregiver. However, the present invention is not limited to this embodiment. For example, in another embodiment, in order to allow the notifying device to generate the corresponding notifying signal when the seat body is pivotally switched to the front facing position or the rear facing position relative to the base, the child safety seat can include two actuating components respectively disposed on the front side and a rear side of the pivoting disc on the seat body, and one actuated device disposed on the front side of the base. Therefore, the front actuating component can actuate actuated device when the seat body is located at the front facing position, and the rear actuating component can actuate actuated device when the seat body is located at the rear facing position.

Figure 7:
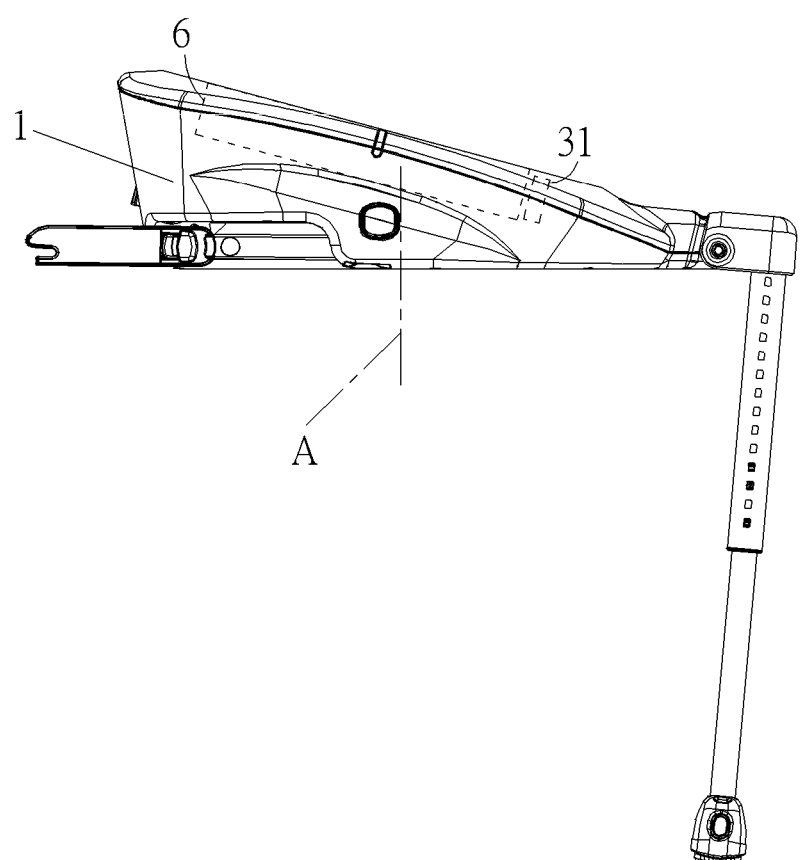
FIG. 7 is an exploded diagram of a child safety seat according to a fourth embodiment of the present invention.
Figure 7:
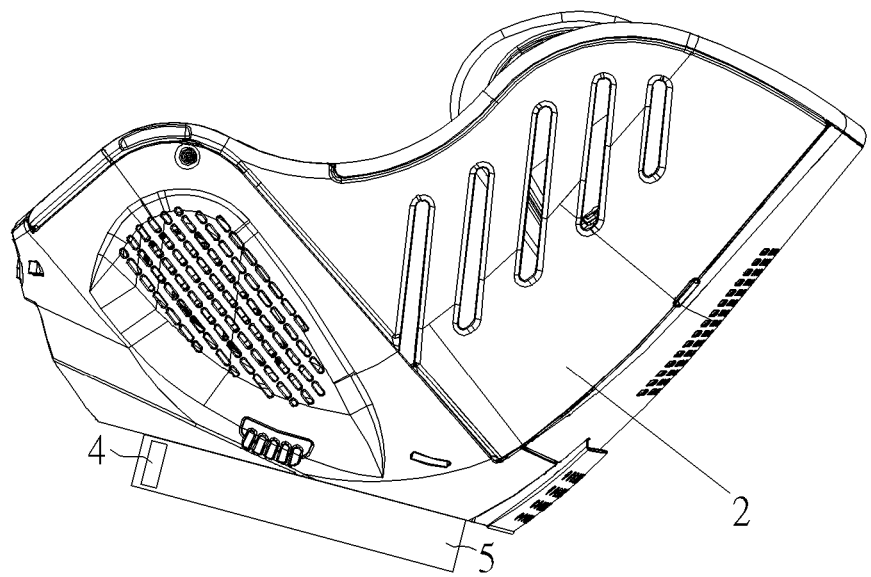

Please refer to FIG. 7. FIG. 7 is an exploded diagram of a child safety seat according to a fourth embodiment of the present invention. As shown in FIG. 7, different from the aforementioned embodiments, in this embodiment, the actuating component 4 is disposed on the front side of the base 1, and the actuated device 31 is disposed on the front side of the pivoting disc 5. Therefore, the actuating component 4 can actuate the actuated device 31 to allow the notifying device to generate the notifying signal when the seat body 2 is pivotally switched to the front facing position relative to the base 1 around the pivoting axis A.

Figure 8:
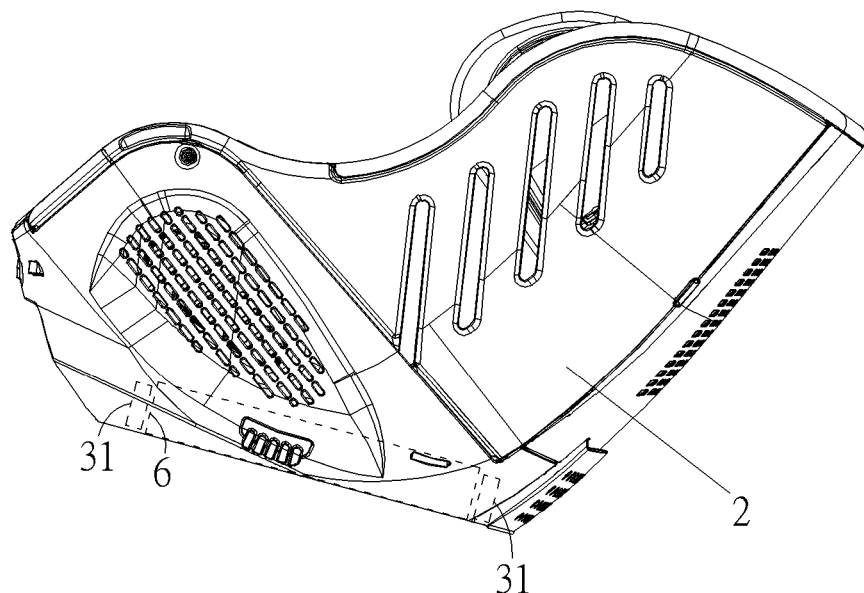
FIG. 8 is an exploded diagram of a child safety seat according to a fifth embodiment of the present invention.
Figure 8:
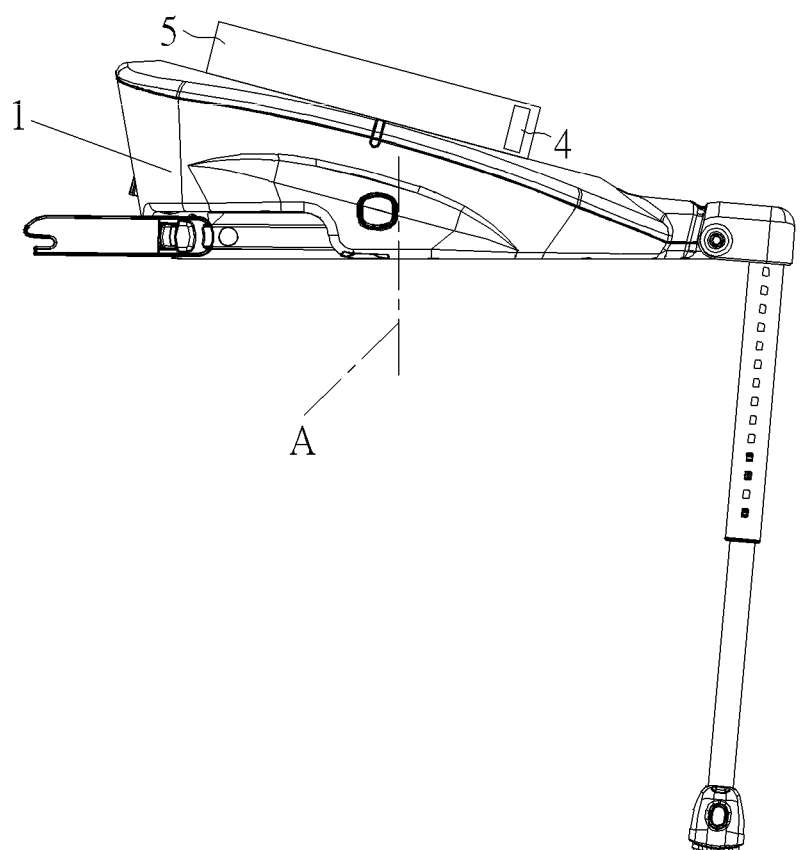

Please refer to FIG. 8. FIG. 8 is an exploded diagram of the child safety seat 100 according to a fifth embodiment of the present invention. As shown in FIG. 8, different from the aforementioned embodiments, in this embodiment, the pivoting disc 5 is disposed on the base 1, and the pivoting recess 6 is formed on the seat body 2. Furthermore, the actuating component 4 is disposed on the front side of the pivoting disc 4, and the two actuated devices 31 are respectively located at the front side and the rear side of the seat body 2. Therefore, the actuating component 4 can actuate the front actuated device 31 or the rear actuated device 31 to allow the notifying device to generate the corresponding notifying signal when the seat body 2 is pivotally switched to the front facing position or the rear facing position relative to the base 1 around the pivoting axis A.

In contrast to the prior art, in the present invention, the child safety seat includes the notifying system which includes the actuated device installed on one of the base and the seat body, the actuating component installed on another one of the base and the seat body and configured to actuate the actuated device when the seat body reaches at least one of the front facing position and the rear facing position, and the notifying device electrically connected to the actuated device and configured to generate the notifying signal when the actuated device is actuated by the actuating component. Furthermore, the notifying signal indicates at least one of the height, the weight and the age of the child corresponding to the seat body reaching the front facing position or the rear facing position. A caregiver can determine whether the child safety seat is suitable for his/her child according to the notifying signal easily without placing his/her child in the child safety seat. Therefore, the present invention is with an easy operation, rapid notification, and improved fool proof design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
   a base;
   a seat body movable relative to the base between a first position and a second position; and
   a notifying system comprising:
     at least one actuated device disposed on one of the base and the seat body;
     an actuating component disposed on another one of the base and the seat body and configured to actuate the at least one actuated device when the seat body reaches at least one of the first position and the second position, the at least one actuated device being actuated to generate different types of actuating signals when the seat body is located at the first position and the second position; and
     a notifying device electrically connected to the at least one actuated device and configured to generate different types of notifying signals when the at least one actuated device is actuated by the actuating component to generate the different types of actuating signals.

2. The child safety seat of claim 1, wherein a pivoting disc is disposed on one of the base and the seat body.

3. The child safety seat of claim 2, wherein a pivoting recess is formed on another one of the base and the seat body, and the pivoting disc is pivotally disposed inside the pivoting recess.

4. The child safety seat of claim 2, wherein the actuating component is disposed on at least one of two different sides of one of the pivoting disc and the base, and the at least one actuated device is disposed on at least one of two different sides of another one of the pivoting disc and the base.

5. The child safety seat of claim 2, wherein the actuating component is disposed on at least one of two opposite sides of one of the pivoting disc and the base, and the at least one actuated device is disposed on at least one of two opposite sides of another one of the pivoting disc and the base.

6. The child safety seat of claim 2, wherein the actuating component is disposed on at least one of a front side and a rear side of one of the pivoting disc and the base, and the at least one actuated device is disposed on at least one of a front side and a rear side of another one of the pivoting disc and the base.

7. The child safety seat of claim 1, wherein the actuating component actuates the at least one actuated device when the seat body is detachably installed on the base and reaches at least one of the first position and the second position.

8. The child safety seat of claim 7, wherein the at least one actuated device is disposed on at least one of two different sides of one of the base and the seat body, and the actuating component is disposed on at least one of two different sides of another one of the base and the seat body.

9. The child safety seat of claim 7, wherein the at least one actuated device is disposed on at least one of two opposite sides of one of the base and the seat body, and the actuating component is disposed on at least one of two opposite sides of another one of the base and the seat body.

10. The child safety seat of claim 7, wherein the at least one actuated device is disposed on at least one of a front side and a rear side of one of the base and the seat body, and the actuating component is disposed on at least one of a front side and a rear side of another one of the base and the seat body.

11. The child safety seat of claim 1, wherein the notifying device comprises a signal processing component electrically connected to the at least one actuated device, and a notifying component electrically connected to the signal processing component, the signal processing component is configured to process a corresponding one of the different types of actuating signals generated from the at least one actuated device when the at least one actuated device is actuated by the actuating component, and the notifying component is configured to receive the corresponding one of the different types of actuating signals processed by the signal processing component to generate a corresponding one of the different types of notifying signals.

12. The child safety seat of claim 11, wherein any two of the at least one actuated device, the signal processing component and the notifying component are connected in a wired connection or a wireless connection.

13. The child safety seat of claim 11, wherein the signal processing component is disposed on one of the base and the seat body, and the notifying component is disposed on another one of the base and the seat body.

14. The child safety seat of claim 11, wherein the signal processing component and the notifying component are disposed on one of the base and the seat body.

15. The child safety seat of claim 11, wherein the notifying component is an audio notifying component or a video notifying component.

16. The child safety seat of claim 1, wherein the at least one actuated device and the notifying device are electrically connected in a series connection, and when the seat body reaches at least one of the first position and the second position, the at least one actuated device and the notifying device are in a closed circuit, so that the notifying device is powered on to generate a corresponding one of the different types of notifying signals.

17. The child safety seat of claim 1, wherein the at least one actuated device is a non-contact sensor or a mechanical switch.

18. The child safety seat of claim 1, wherein a corresponding one of the different types of notifying signals indicates at least one of a height, a weight and an age of a child corresponding to the seat body reaching the first position or the second position.

19. The child safety seat of claim 1, wherein the seat body is pivoted to the base around a pivoting axis, and the seat body is pivotally movable between the first position and the second position around the pivoting axis.

20. The child safety seat of claim 1, wherein the first position and the second position are respectively a front facing position and a rear facing position.

* * * * *